United States Patent
Durniak et al.

(10) Patent No.: US 9,560,052 B2
(45) Date of Patent: *Jan. 31, 2017

(54) INSTALLING VIRTUAL MACHINES WITHIN DIFFERENT COMMUNICATION PATHWAYS TO ACCESS PROTECTED RESOURCES

(71) Applicant: International Business Machines Corporation, Armonk, NY (US)

(72) Inventors: Timothy Durniak, Poughkeepsie, NY (US); Robert R. Friedlander, Southbury, CT (US); James R. Kraemer, Santa Fe, NM (US); Jeb R. Linton, Manassas, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/204,034

(22) Filed: Jul. 7, 2016

(65) Prior Publication Data
US 2016/0381033 A1    Dec. 29, 2016

Related U.S. Application Data

(63) Continuation of application No. 14/749,116, filed on Jun. 24, 2015, now Pat. No. 9,459,912.

(51) Int. Cl.
*H04L 29/06* (2006.01)
*G06F 9/455* (2006.01)
(Continued)

(52) U.S. Cl.
CPC .......... *H04L 63/10* (2013.01); *G06F 9/45558* (2013.01); *G06F 9/468* (2013.01); *G06F 9/5027* (2013.01);
(Continued)

(58) Field of Classification Search
CPC ...... H04L 63/10; H04L 63/14; H04L 67/1078; H04L 67/34; G06F 9/45558; G06F 9/468; G06F 9/5027; G06F 21/53; G06F 2009/45562; G06F 2009/45587; G06F 2009/45595; G06F 2209/503; G06F 2221/2149
See application file for complete search history.

(56) References Cited

U.S. PATENT DOCUMENTS

| 8,447,273 B1 | 5/2013 | Friedlander et al. |
| 8,701,174 B1 * | 4/2014 | Dotan ................... H04L 9/3228 709/203 |

(Continued)

OTHER PUBLICATIONS

"Virtual Machine." Wikipedia: The Free Encyclopedia. Wikimedia Foundation, Inc. Last modified Jun. 24, 2015. Web. Retrieved Jun. 24, 2015. pp. 1-8. <https://en.wikipedia.org/wiki/Virtual_machine>.

(Continued)

*Primary Examiner* — Benjamin Wu
(74) *Attorney, Agent, or Firm* — Law Office of Jim Boice

(57) ABSTRACT

A computer-implemented method, system, and/or computer program product controls access to computer resources used by a computer application. One or more processors fractionate a computer application into disparate components. Two or more of the disparate components are assigned to different communication pathways, where the different communication pathways lead to requisite resources needed to execute the disparate components. One or more processors create and install a virtual machine within at least one of the different communication pathways, such that the virtual machine controls access to a particular requisite resource by a particular disparate component. One or more processors then issue a resource retrieval instruction to retrieve the (Continued)

particular requisite resource via the virtual machine and at least one of the different communication pathways.

16 Claims, 7 Drawing Sheets

(51) Int. Cl.
*H04L 29/08* (2006.01)
*G06F 9/46* (2006.01)
*G06F 9/50* (2006.01)
*G06F 21/53* (2013.01)

(52) U.S. Cl.
CPC .............. *G06F 21/53* (2013.01); *H04L 63/14* (2013.01); *H04L 67/1078* (2013.01); *H04L 67/34* (2013.01); *G06F 2009/45562* (2013.01); *G06F 2009/45587* (2013.01); *G06F 2009/45595* (2013.01); *G06F 2209/503* (2013.01); *G06F 2221/2149* (2013.01)

(56) References Cited

U.S. PATENT DOCUMENTS

| | | | |
|---|---|---|---|
| 8,713,633 B2 | 4/2014 | Thomas | |
| 8,938,775 B1* | 1/2015 | Roth et al. | G06F 21/606 726/1 |
| 8,978,122 B1* | 3/2015 | Zolfonoon | H04L 63/0815 726/4 |
| 9,141,785 B2* | 9/2015 | Mukkara | G06F 21/53 |
| 9,240,996 B1* | 1/2016 | Sinnema | H04L 63/10 |
| 9,275,004 B2* | 3/2016 | Zhu | G06F 9/45558 |
| 2005/0149726 A1* | 7/2005 | Joshi | G06F 21/51 713/164 |
| 2007/0089111 A1* | 4/2007 | Robinson | G06F 21/53 718/1 |
| 2008/0028436 A1* | 1/2008 | Hannel | H04L 63/0218 726/1 |
| 2010/0088698 A1* | 4/2010 | Krishnamurthy | G06F 9/5011 718/1 |
| 2011/0231840 A1* | 9/2011 | Burch | G06F 9/45533 718/1 |
| 2013/0036449 A1* | 2/2013 | Mukkara | G06F 9/5072 726/1 |
| 2013/0061310 A1 | 3/2013 | Whitmyer et al. | |
| 2013/0291062 A1* | 10/2013 | Bursell | G06F 21/44 726/4 |
| 2014/0006598 A1* | 1/2014 | Uola | G06F 9/5077 709/224 |
| 2014/0068602 A1* | 3/2014 | Gember | G06F 9/45558 718/1 |
| 2014/0096199 A1 | 4/2014 | Dave et al. | |
| 2014/0181809 A1* | 6/2014 | Lvovsky | G06F 9/45558 718/1 |
| 2014/0282889 A1* | 9/2014 | Ishaya | H04L 63/08 726/4 |
| 2014/0351809 A1* | 11/2014 | Chawla | G06F 9/45533 718/1 |
| 2014/0379711 A1* | 12/2014 | Branson | G06F 17/30595 707/736 |
| 2015/0040180 A1* | 2/2015 | Jacobson | G06F 21/62 726/1 |
| 2015/0121549 A1* | 4/2015 | Baessler | H04L 63/10 726/28 |
| 2015/0193637 A1* | 7/2015 | Booth | G06F 21/6245 726/30 |
| 2015/0242629 A1* | 8/2015 | Lindo | G06F 21/53 726/1 |
| 2015/0244716 A1* | 8/2015 | Potlapally | H04L 63/064 713/155 |
| 2015/0271195 A1* | 9/2015 | Lietz | H04L 63/1433 726/7 |
| 2015/0381480 A1* | 12/2015 | Ohara | H04L 12/6418 370/392 |
| 2016/0147552 A1* | 5/2016 | Zhang | G06F 9/45558 718/1 |
| 2016/0164911 A1* | 6/2016 | Karasaridis | H04L 63/1458 726/23 |

OTHER PUBLICATIONS

P. Mell et al., "The NIST Definition of Cloud Computing", National Institute of Standards and Technology, Information Technology Laboratory, Sep. 2011, pp. 1-7.

* cited by examiner

INSTALLING VIRTUAL MACHINES WITHIN DIFFERENT COMMUNICATION PATHWAYS TO ACCESS PROTECTED RESOURCES

BACKGROUND

The present disclosure relates to the field of computers, and specifically to the field of computers that are networked to computer resources. Still more specifically, the present disclosure relates to the field of controlling and protecting access to computer resources that are used by a computer application.

Computer networks are becoming more and more widespread. Rather than simply connecting computers together locally, computer networks now connect resources over large areas, using the Internet, the "Cloud" (which provides access to software and hardware resources to a user via a wide area network (WAN) such as the Internet), as well as dedicated enterprise-wide WANs. However, placing such resources on a computer network exposes them to exposure to malevolence, such as unauthorized access, use, and/or damage to such resources, particularly as access to these types of resources become easier and easier at the hand of sophisticated hackers and other malicious actors.

SUMMARY

In an embodiment of the present invention, a computer-implemented method controls access to computer resources used by a computer application. One or more processors fractionate a computer application into disparate components. The processor(s) assign two or more of the disparate components to different communication pathways that lead to requisite resources needed to execute the disparate components. The processor(s) create a virtual machine that controls access to a particular requisite resource by a particular disparate component, where the particular disparate component further comprises a command layer instruction. The processor(s) install the virtual machine within at least one of the different communication pathways to control access to the particular requisite resource by the particular disparate component. The processor(s) transmit a resource retrieval instruction to retrieve the particular requisite resource via the virtual machine and the at least one of the different communication pathways. The processor(s) install multiple virtual machines in series within at least one of the different communication pathways, wherein the multiple virtual machines comprise a first virtual machine and a second virtual machine. The processor(s) assign a first address message to the first virtual machine, where the first address message identifies only an address of the second virtual machine, and where the first address message instructs the first virtual machine to send the resource retrieval instruction to the second virtual machine. The processor(s) assign a second address message to the second virtual machine, where the second address message identifies only an address of the particular requisite resource, and where the second address message instructs the second virtual machine to send the resource retrieval instruction to the particular requisite resource. The processor(s) fractionate the command layer instruction into disparate command layer components, and assign a first disparate command layer component from the disparate command layer components to the first virtual machine. The processor(s) execute the first disparate command layer component to create a command virtual machine, and control the first virtual machine via the command virtual machine.

In an embodiment of the present invention, a computer program product is executable by a computer system to control access to computer resources used by a computer application by the following method. A computer application is fractionated into disparate components. Two or more of the disparate components are assigned to different communication pathways that lead to requisite resources needed to execute the disparate components. A virtual machine is created. The virtual machine controls access to a particular requisite resource by a particular disparate component. The virtual machine is installed within at least one of the different communication pathways to control access to the particular requisite resource by the particular disparate component. A resource retrieval instruction is transmitted to retrieve the particular requisite resource via the virtual machine and the at least one of the different communication pathways. A threat level is defined for the particular requisite resource, and a quantity of virtual machines between the computer application and the particular requisite resource is adjusted according to the threat level for the particular requisite resource.

DETAILED DESCRIPTION

Figure 1:
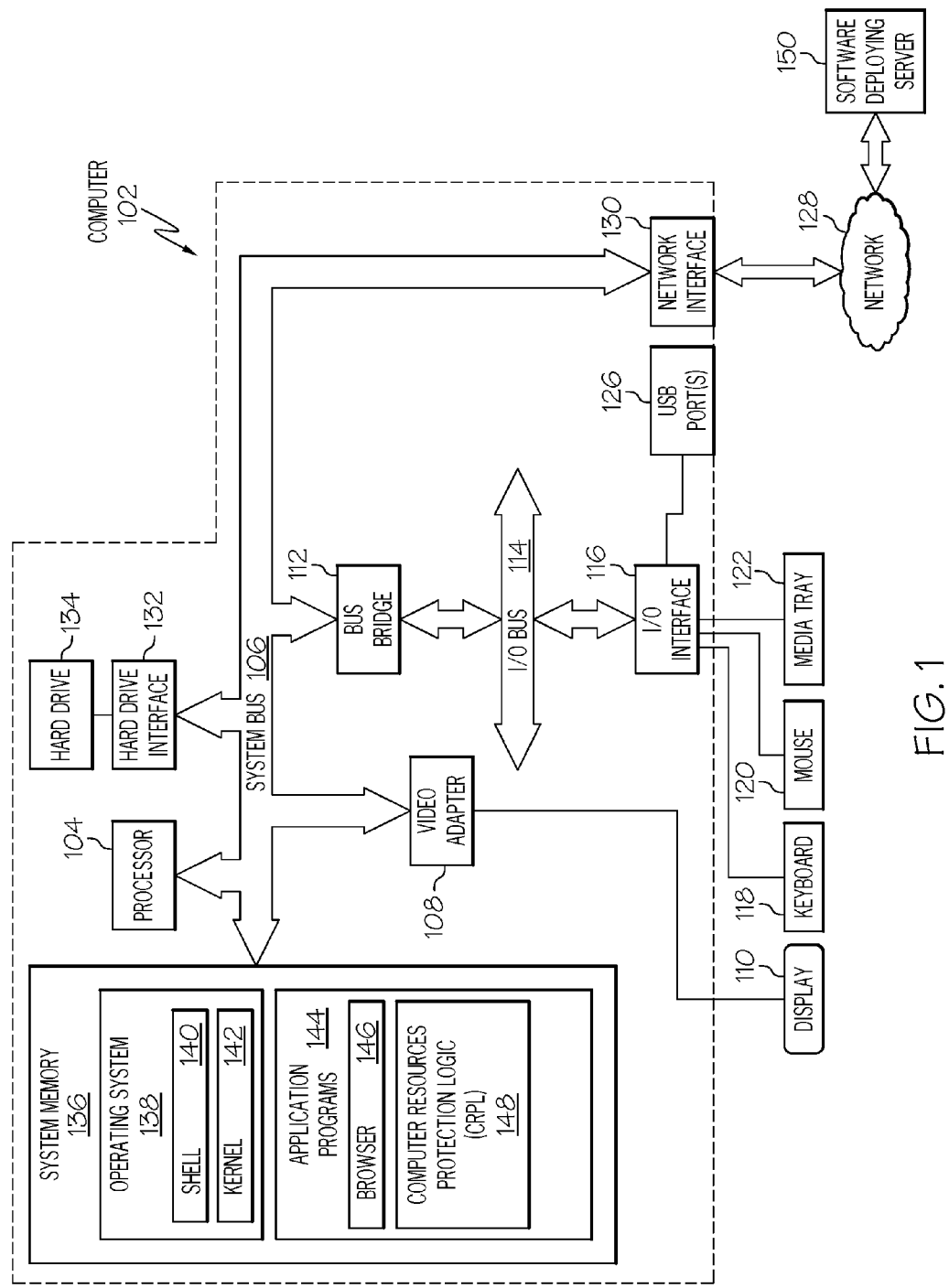
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 102 may be utilized by software deploying server 150 shown in FIG. 1, and/or user's computer 202, resource server 204, management computer 206, one or more of the requisite resources 208a-208c, and/or the virtual machine support computer 216 depicted in FIG. 2; as well as the management computer 306 and/or the virtual machine support computer 316 shown in FIG. 3.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), and external USB port(s) 126. While the format of the ports connected to I/O interface 116 may be any known to those skilled in the art of computer architecture, in one embodiment some or all of these ports are universal serial bus (USB) ports.

Figure 2:
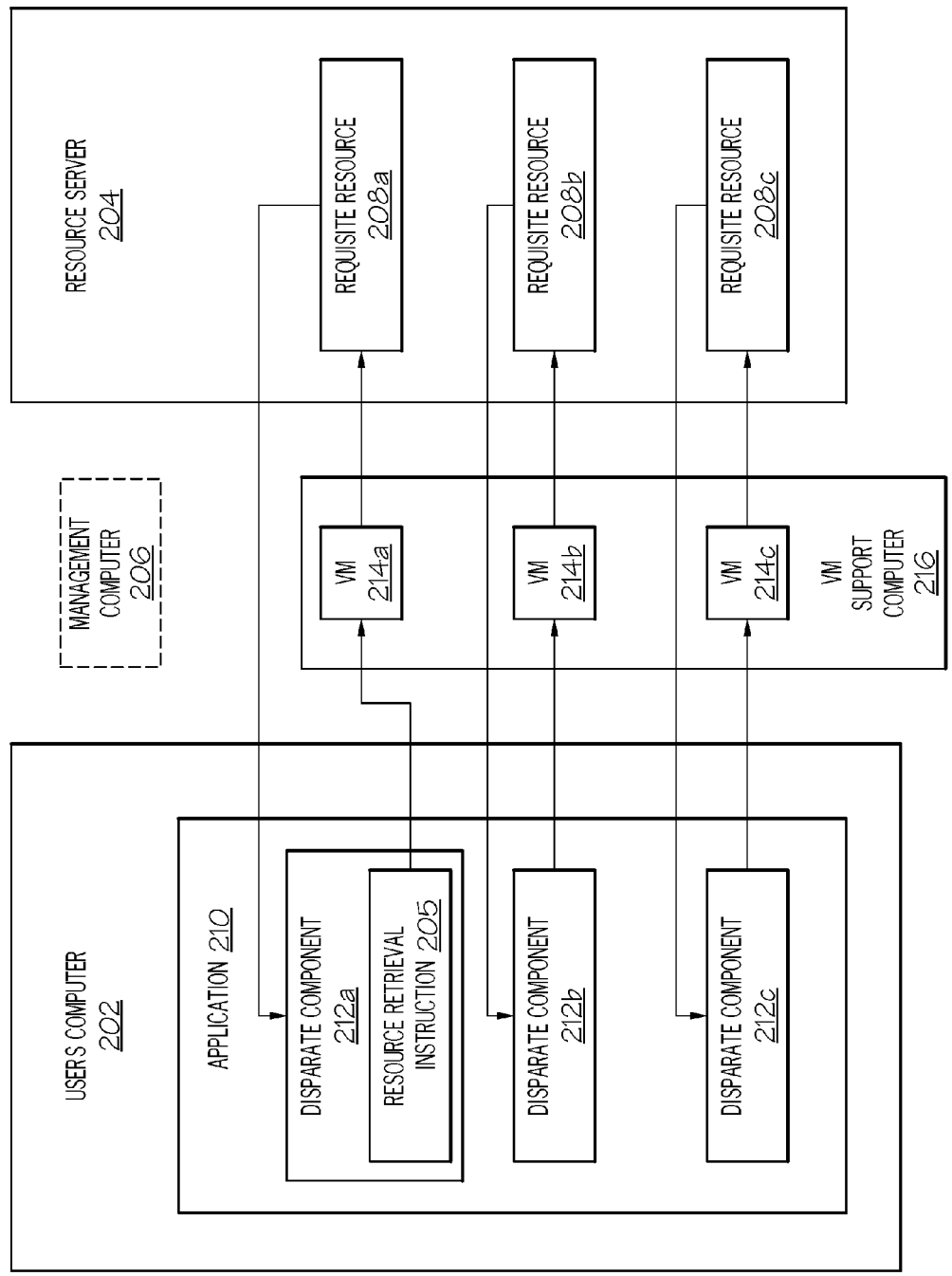
FIG. 2 illustrates an overview of a use of virtual machines to protect requisite resources used to execute disparate components in an application that is running on a user's computer in accordance with one or more embodiments of the present invention.

As depicted, computer 102 is able to communicate with a software deploying server 150 and/or other devices/systems (e.g., user's computer 202, resource server 204, management computer 206, and/or one or more of the requisite resources 208a-208c depicted in FIG. 2) using a network interface 130. Network interface 130 is a hardware network interface, such as a network interface card (NIC), etc. Network 128 may be an external network such as the Internet, or an internal network such as an Ethernet or a virtual private network (VPN). In one or more embodiments, network 128 is a wireless network, such as a Wi-Fi network.

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other systems.

Application programs 144 in computer 102's system memory (as well as software deploying server 150's system memory) also include Computer Resources Protection Logic (CRPL) 148. CRPL 148 includes code for implementing the processes described below, including those described in FIGS. 2-4. In one embodiment, computer 102 is able to download CRPL 148 from software deploying server 150, including in an on-demand basis, wherein the code in CRPL 148 is not downloaded until needed for execution. In one embodiment of the present invention, software deploying server 150 performs all of the functions associated with the present invention (including execution of CRPL 148), thus freeing computer 102 from having to use its own internal computing resources to execute CRPL 148.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

With reference now to FIG. 2, an overview of a use of virtual machines to protect requisite resources used to execute disparate components in an application that is running on a user's computer in accordance with one or more embodiments of the present invention is presented.

As shown in FIG. 2, an application 210 is installed on a user's computer 202. As described herein, the application 210 is fractionated into multiple components, depicted as disparate components 212a-212c (where "c" is an integer). Used herein, the term "fractionate" is defined as separating a software application into various components, thus defining these various components.

In one or more embodiments of the present invention, one or more processors fractionate the application 210. Such processors fractionate the application 210 into disparate components having similar functions or different functions.

For example, consider the embodiment in which processors fractionate the application 210 into components that have similar functions. An example of this embodiment may be fractionating different areas of a graphical user interface (GUI), regardless of what the areas represent. For example, the GUI may depict a website containing various photos. The processors will identify the different photos (e.g., by examining the hyptertext markup language—HTML code that produced the different photos) as being disparate components of the GUI (even though they have the similar function of displaying photos on the GUI). However, the processors can further extract metadata about each of the photos to determine what level of sensitivity they hold, which photos are copyright protected, etc., thus allowing the present invention to adjust access to any requisite resources needed to display, enhance, etc. the photos.

In an embodiment in which the disparate components of the application 210 has different functions, consider the example of an application that 1) displays content on a GUI, 2) receives data inputs, 3) encrypts content in the application, 4) determines where resources are located, etc. The processors are able to examine the code in the application 210 (e.g., by reading non-executable comments in the source code) to identify the functions of various sub-components (disparate components) of the application 210. Each of these sub-components can then be handled in a different manner. For example, code used to display content on the GUI may not need to have a protective virtual machine (e.g., one or more of the virtual machines 214a-214c described herein), while code used to retrieve protected data may utilize additional security (e.g., see FIG. 3 below).

Thus, in one embodiment of the present invention, each of the disparate components 212a-212c is similar in functionality. However, in a preferred embodiment of the present invention, each of the disparate components 212a-212c has different functionalities.

For example, disparate component 212a may be code that generates a graphical user interface (GUI) being displayed on a display (e.g., display 110 shown in FIG. 1) on the user's computer 202, while disparate component 212b may be code that receives keystroke inputs (e.g., from the keyboard 118 shown in FIG. 1), while disparate component 212c may be code that enables network communication (e.g., via the network 128 shown in FIG. 1) between the user's computer 202 and the resource server 204 (e.g., by defining IP ports to be used in the network communication).

In a preferred embodiment of the present invention, there is no direct communication going from the user's computer 202 to the resource server 204. That is, all communications from the disparate components 212a-212c of application 210 are via the depicted virtual machines 214a-214c (where "c" is an integer).

Virtual machines 214a-214c are software-based emulations of a physical computer (e.g., virtual machine support computer 216 shown in FIG. 2). These software-based emulations run on a physical computer, but are not the physical computer itself. As such, a single physical computer can run emulations of different types of computer architecture, which emulate running on the same or different types of operating systems.

In one or more embodiments of the present invention, the virtual machines 214a-214c are hidden from the user and/or entities that are prying into the operations of the user's computer 202, as described in detail below.

In one or more embodiments of the present invention, there is no direct communication from the resource server 204 back to the user's computer 202. That is, even though FIG. 2 shows one embodiment of the present invention in which the requisite resources 208a-208c (where "c" is an integer) are transmitted directly back to the disparate components 212a-212c, in a preferred embodiments the requisite resources 208a-208c are transmitted back to the disparate components 212a-212c via the virtual machines 214a-214c.

Creation of Virtual Machines

Virtual machines 214a-214c may be created by user's computer 202 and/or by management computer 206 and/or by a combination of virtual machines 214a-214c and management computer 206.

In one embodiment in which the virtual machines 214a-214c are created by user's computer 202, instructions for creating the virtual machines 214a-214c are located in a command layer of a request (e.g., resource retrieval instruction 205) to retrieve one or more of the requisite resources 208a.

Use of Virtual Machines to Access Needed Resources

Assume now that disparate component 212a shown in FIG. 2 needs requisite resource 208a in order to execute or otherwise function.

User's computer 202 sends a resource retrieval instruction (e.g., resource retrieval instruction 205) that is addressed to a virtual machine support computer 216 (rather than resource server 204 that actually contains the needed requisite resource 208a being called upon by the resource retrieval instruction 205 on behalf of disparate component 212a). The virtual machine support computer 216 responds to the resource retrieval instruction 205 by calling up or creating a virtual machine (e.g., virtual machine 214a), which will handle the resource retrieval instruction 205. The receiving virtual machine 214a then communicates with the resource server 204 to retrieve the requested requisite resource 208a, such that there is no direct communication from the user's computer 202 to the resource server 204.

In one embodiment, the virtual machine support computer 216 locates the address of the requisite resource 208a needed by the disparate component 212a by extracting (preferably encrypted) information from a command layer in the resource retrieval instruction 205. This encrypted information (which is decrypted by a decryption key held by the virtual machine support computer 216) may be a first element of a dyad in a lookup table stored in the virtual machine support computer 216. That is, the command layer in the resource retrieval instruction 205 may identify the resource needed by disparate component 212a as simply "X". Stored within the virtual machine support computer 216 is a lookup table (not depicted), which matches "X" to the address of requisite resource 208a. Without having access to this lookup table (which is protected within the virtual machine support computer 216 by encryption, a firewall, etc.), a sniffer is unable to know which requisite resource "X" is being requested by disparate component 212a.

In one embodiment of the present invention, resource retrieval instruction 205 is addressed to resource server 204. However, resource retrieval instruction 205 is intercepted by virtual machine support computer 216, which reads the command layer in resource retrieval instruction 205, directing the virtual machine support computer 216 to generate the virtual machine 214a needed to access the requisite resource 208a, which has been trained (i.e., has network port code that controls incoming messages) to ignore any requests that do not come from a virtual machine within virtual machine support computer 216.

The virtual machine support computer 216 then uses an IP address or other communication port of the newly created virtual machine 214a to communicate with the requisite resource 208a in order to start a session. This address/port is dynamically created and concealed from the user's computer, such that the user's computer 202 does not know which address/port is being used to access the requisite resource 208a. In one embodiment, the virtual machine support computer 216 also directs the resource server 204 to generate a new address/port for by the requisite resource 208a and returning that new address/port to the virtual machine support computer 216, thus providing an additional layer of security between the virtual machine support computer 216 and the resource server 204.

The requisite resources 208a-208c are hardware and/or software resources that are required by the disparate components 212a-212c for their execution. This dependency may be one-to-one (e.g., where requisite resource 208a is required by only disparate component 212a as depicted), one-to-many (e.g., where requisite resources 208a-208b both required by disparate component 212a), or many-to-one (e.g., where disparate components 212a-212b both need requisite resource 208a).

In one embodiment of the present invention, a management computer 206 as described above creates the virtual machines 214a-214c and/or assigns network addresses to the virtual machines 214a-214c and/or the requisite resources 208a-208c described above. For example, assume that the management computer 206 intercepts a request from disparate component 212a for requisite resource 208a. In response to intercepting this request, the management computer 206 will direct the virtual machine support computer 216 to create virtual machine 214a, thus providing the pathway needed to access the requisite resource 208a.

As indicated above, the requisite resources 208a-208c may be hardware, software, and/or a combination thereof. For example, assume that application 210 is a bookkeeping program. Assume further that disparate component 212a is code for loading data into the bookkeeping program. The data that is to be loaded into the bookkeeping program is stored on resource server 204 in a database depicted as requisite resource 208a. This database is required by the disparate component 212a, and thus is known as the "requisite" resource 208a.

Similarly and continuing with the example of application 210 being a bookkeeping program, assume that disparate component 212b is the code in the application 210 that generated a graphical user interface (GUI) being displayed on the user's computer when executing the bookkeeping program. Requisite resource 208b may be a GUI template that is used by the application 210 and is available from the resource server 204.

As stated above, a requisite resource may be hardware. For example, assume that disparate component 212c is a subroutine that requires more processing power to retrieve and analyze data used by the application 210 than is available from the user's computer 202 (e.g., if the user's computer 202 is a smart phone with limited processing power). As such, the disparate component 212c needs the processing power provided by a computer depicted as requisite resource 208c. In this case, the resource server 204 may allocate some of its own processing resources to function as requisite resource 208c, or resource server 204 may be a cloud service and/or a service-oriented architecture (SOA) that leases out computer time from other computing devices (which are represented by requisite resource 208c).

Regardless of whether some or all of the requisite resources 208a-208c are software or hardware, in a preferred embodiment of the present invention, the virtual machines 214a-214c provide a protective layer between the application 210 (and its disparate components 212a-212c) and the resource server 204 (and the requisite resources 208a-208c that it provides). In accordance with one or more embodiments of the present invention, virtual machines 214a-214c are dynamic, their placement is variable, their lifetimes are transient, and/or are hidden from the user of user's computer 202 and/or any logic that "sniffs" the user's computer.

Dynamic Virtual Machines

In one or more embodiments of the present invention, one or more of the virtual machines 214a-214c are generated in response to a determination that one or more of the disparate components 212a-212c needs a particular resource from the requisite resources 208a-208c. For example, assume that application 210 is executing on the user's computer 202, but disparate component 212a is not currently needed/executing. As such, virtual machine 214a has not been created yet, since there is no need for requisite resource 208a. However, once a determination is made that disparate component 212a is executing (or is about to execute), the virtual machine 214a will be generated. For example, if a component of application 210 calls disparate component 212a, then the user's computer 202 will determine/know that requisite resource 208a will be needed, and thus virtual machine 214a is created.

Variable Placement of Virtual Machines

In one or more embodiments of the present invention, one or more of the virtual machines 214a-214c can be placed in a different logical location every time it is created. For example, when the user's computer 202 and/or the management computer 206 generate virtual machine 214a, virtual machine 214a may be accessed via a particular port (i.e., a software construct that acts as a communications endpoint, such as an IP port address). If the virtual machine 214a is always addressed at the same port on the host (physical) computer (i.e., virtual machine support computer 316), then it is easier to hack into than if it is located at a different port every time it is created. Thus, in a preferred embodiment the virtual machines 214a-214c are variably placed at different logical locations.

Transient Virtual Machines

In one or more embodiments of the present invention, one or more of the virtual machines 214a-214c have a limited lifetime, and thus are transient. That is, assume that virtual machine 214a in FIG. 2 has been created. Once virtual machine 214a is created, it is not permanent, but rather will be deconstructed (dematerialized) after some amount of time or after some event. For example, virtual machine 214a may be set to expire ("vanish") after 5 minutes ("some amount of time"). However, in a preferred embodiment, the virtual machine 214a will be dematerialized after certain events. For example, assume that disparate component 212a is sending structured query language (SQL) messages to requisite resource 208a, which is a relational database management system (RDBMS). Each SQL message contains a request for specific data from the RDBMS. Depending on how secure the system should be, a new virtual machine 214a will be generated to handle every SQL message from the disparate component 212a, or else will be generated to handle a certain number of SQL messages (e.g., 20) from the disparate component 212a.

Similarly, the virtual machine 214a may be "alive" as long as the disparate component 212a is executing. However, once the disparate component 212a stops running (e.g., is in a time-out, a stall, or a call to the disparate component 212a from another component in application 210 is completed) then the virtual machine 214a will be dismantled.

Hidden Virtual Machines

In one or more embodiments of the present invention, one or more of the virtual machines 214a-214c are hidden. That is, one or more of the virtual machines 214a-214c may be hidden from a user of user's computer 202 and/or from a "sniffer" of the user's computer 202. The virtual machines 214a-214c are hidden since they are dynamically created by the virtual machine support computer 316, which is the only device that knows their address and features (unless management computer 306 is also involved to this extent).

By being hidden from the user of user's computer 202, the user is unaware of the existence of virtual machines 214a-214c. That is, the user merely sees the requisite resources 208a-208c being returned to the user's computer 202, without being able to see the virtual machines 214a-214c. Thus, all creation and use of the virtual machines 214a-214c are performed by software within the virtual machine support computer 216 and/or management computer 206.

Similarly, the existence of the virtual machines 214a-214c may be hidden from sniffers. A "sniffer" is defined as a computer program that monitors traffic going to and from a computer such as the user's computer 202. If the user's computer 202 creates the virtual machines 214a-214c using the command layer described above, then a sniffer operating against the user's computer 202 will not be able to determine the identity or location of the virtual machines 214a-214c, since these identities/locations are dynamically determined at the virtual machine support computer 216. Similarly, if the virtual machines 214a-214c are created by the management computer 206 as described above, then a sniffer will not be able to determine the identity or location of the virtual machines 214a-214c, since these identities/locations are dynamically determined at the virtual machine support computer 216 under the direction of the management computer 206, whose location and/or identity will be unknown to the sniffer that monitors traffic to and from the user's computer 202.

While the system and method shown in FIG. 2 provides a high level of protection for the requisite resources 208a-

Figure 3:
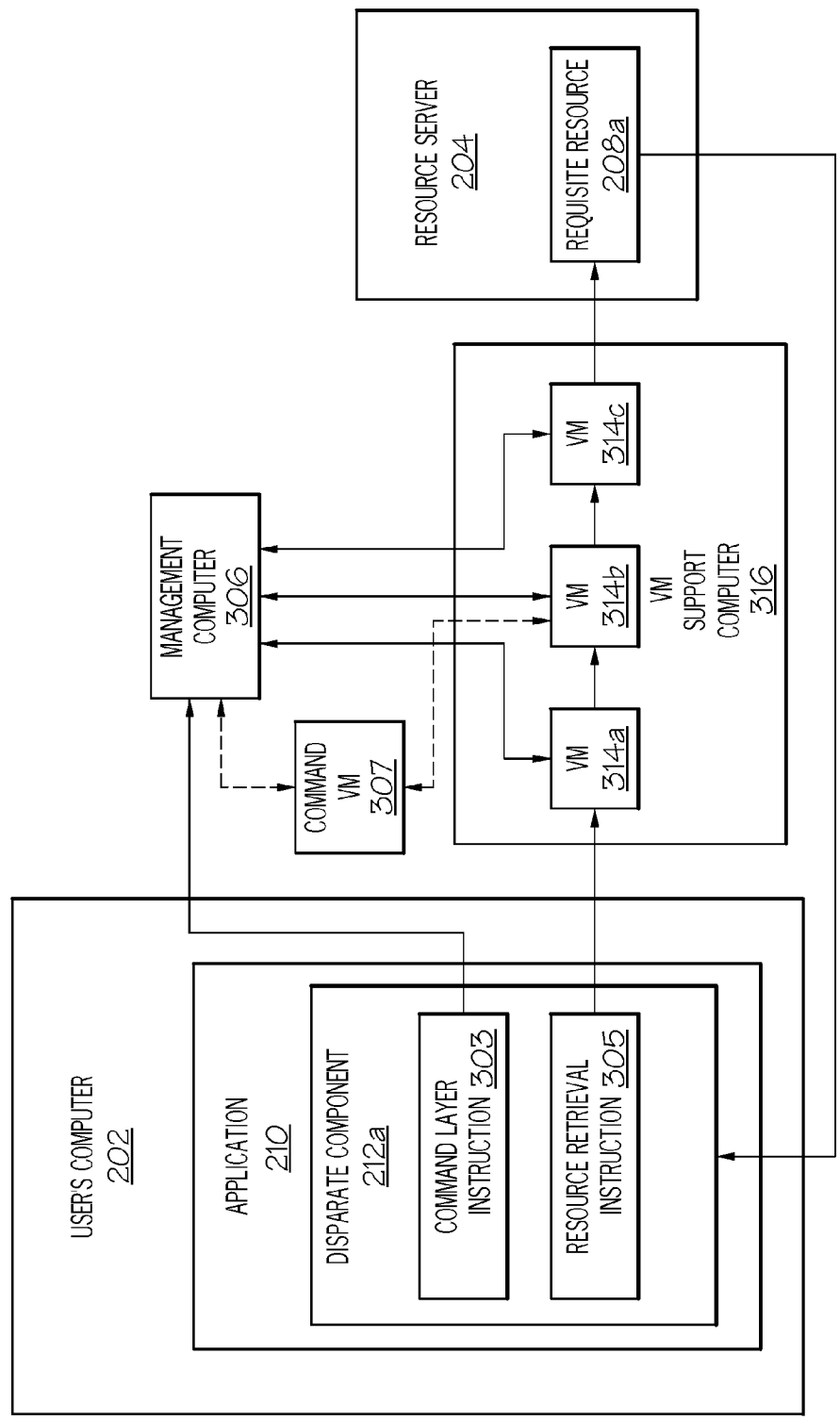
FIG. 3 depicts the use of serially-linked virtual machines to protect a requisite resource used by an application in a user's computer.

208c, the system and method shown in FIG. 3 provides even greater protection through the use of serially linked virtual machines.

As shown in FIG. 3, assume that disparate component 212a has issued (i.e., transmitted) a resource retrieval instruction 305 requesting access to requisite resource 208a (as described above in FIG. 2 with reference to resource retrieval instruction 205). As in FIG. 2, the resource retrieval instruction 305 is intercepted by a virtual machine support computer 316, which supports multiple virtual machines 314a-314c (where "c" is an integer). Each of the virtual machines 314a-314c is under the control of a management computer 306, which not only manages the creation of the virtual machines 314a-314c, but also manages the movement of the resource retrieval instruction 305 through the chain of virtual machines 314a-314c.

That is, when resource retrieval instruction 305 is sent to resource server 204 for retrieval of requisite resource 208a, virtual machine support computer 316 intercepts resource retrieval instruction 305. In one embodiment of the present invention, the resource server 204 realizes that it is only able to respond to requests from virtual machine support computer 316 due to settings in its incoming message port(s). Thus, the resource retrieval instruction 305 is sent directly to the virtual machine support computer 316, or else it is sent to the management computer 306 known to be associated with the virtual machine support computer 316.

In either embodiment (i.e., regardless of whether the resource retrieval instruction 305 is sent from the resource server 204 directly to the virtual machine support computer 316 or to the management computer 306), the resource retrieval instruction 305 is initially sent to virtual machine 314a for processing. Virtual machine 314a is then instructed by management computer 306 to send the resource retrieval instruction 305 to virtual machine 314b. In one or more embodiments of the present invention, virtual machine 314b is not created (by management computer 306 and/or virtual machine support computer 316) until management computer 306 and/or virtual machine support computer 316 directs virtual machine 314a to send the resource retrieval instruction 305 to a next virtual machine. Thus, an outside sniffer/snooper is unable to predict beforehand where the resource retrieval instruction 305 will go next, since the next destination has not even been created yet.

Once the virtual machine 314b is created, then the management computer 306 gives virtual machine 314a only the address (e.g., an IP address, a port number, a media access control (MAC) address, etc.) of virtual machine 314b along with instructions to forward/send the resource retrieval instruction 305 to virtual machine 314b. In response to virtual machine 314b receiving the resource retrieval instruction 305, management computer 306 creates virtual machine 314c, and gives virtual machine 314b only the address of virtual machine 314c along with instructions to forward the resource retrieval instruction 305 to virtual machine 314c.

The management computer 306 then directs virtual machine 314c to send the resource retrieval instruction 305 to resource server 204, which retrieves the requested requisite resource 208a. At this point, the management computer 306 can direct the resource server 204 to send the requisite resource 208a directly back to the disparate component 212a (as illustrated in FIG. 3), or else the management computer 306 can direct the resource server 204 to send the requisite resource 208a back through one or more of the virtual machines 314a-314c, all under the creation and management of management computer 306 as described above when sending the resource retrieval instruction 305 to the resource server 204.

Figure 4:
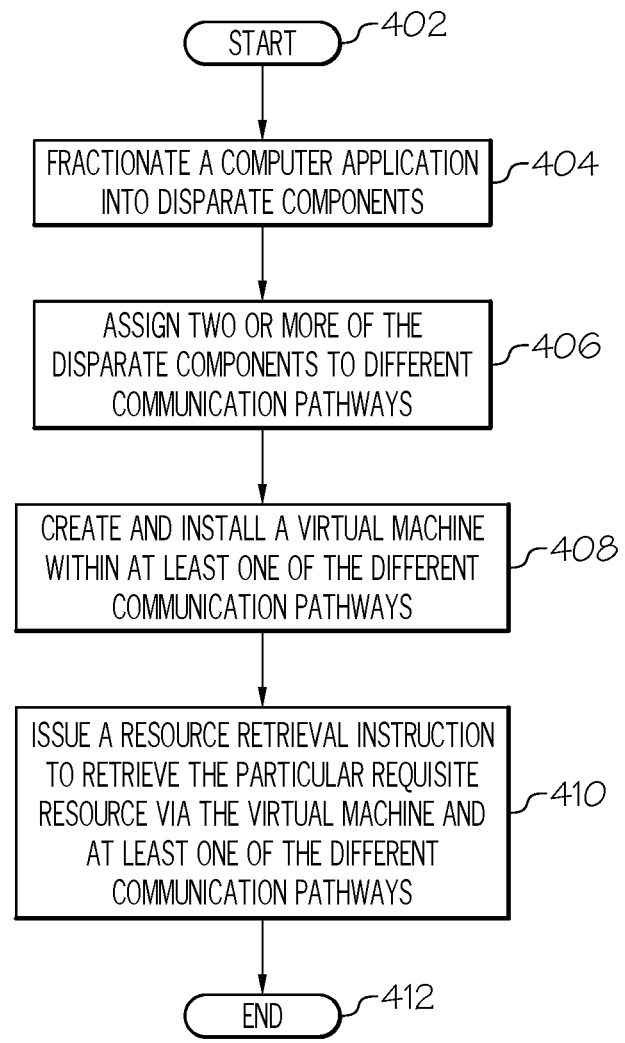
FIG. 4 is a high-level flow chart of one or more steps performed by one or more processors to protect requisite resources used to execute disparate components in an application running in a user's computer.

With reference now to FIG. 4, a high-level flow chart of one or more steps performed by one or more processors to protect requisite resources used to execute disparate components in an application running in a user's computer is presented.

After initiator block 402, one or more processors fractionate a computer application into disparate components (i.e., divide the computer application into different components, which may have similar or different types of functionalities), as described in block 404. Thus, as described in the example shown in FIG. 2, an application 210 is fractionated into disparate components 212a-212c.

As described in block 406 in FIG. 4, one or more processors assign two or more of the disparate components to different communication pathways, wherein the different communication pathways lead to requisite resources needed to execute the disparate components. With reference again to the example shown in FIG. 2, disparate component 212a is assigned to use the top pathway to requisite resource 208a, while disparate component 212b is assigned to use the middle pathway to requisite resource 208b, and disparate component 212c is assigned to use the lower pathway to requisite resource 208c.

As described in block 408 in FIG. 4, one or more processors (e.g., within the virtual machine support computer 216 and/or the management computer 206 shown in FIG. 2) create and install a virtual machine (e.g., virtual machine 214a) within at least one of the different communication pathways, wherein the virtual machine controls access to a particular requisite resource by a particular disparate component, as described above.

As described in block 410 of FIG. 4, one or more processors (e.g., within user's computer 202 shown in FIG. 2) then issue (i.e., transmit) a resource retrieval instruction to retrieve the particular requisite resource via the virtual machine (e.g., virtual machine 214a) and at least one of the different communication pathways (e.g., going from disparate component 212a to requisite resource 208a).

The flow-chart of FIG. 4 ends at terminator block 412.

In one embodiment of the present invention, one or more processors (e.g., within management computer 206, virtual machine support computer 216, and/or user's computer 202 shown in FIG. 2) then retrieve the particular requisite resource (e.g., requisite resource 208a), which is then used by user's computer 202 to execute the particular disparate component (e.g., disparate component 212a).

In one embodiment of the present invention, one or more processors (e.g., within the management computer 206 and/or the virtual machine support computer 216 shown in FIG. 2) set an expiration time for the virtual machine within at least one of the different communication pathways. In response to the expiration time passing for the virtual machine within at least one of the different communication pathways, these one or more processors dematerialize (i.e., deconstruct, retire, disable, etc.) the virtual machine, such that dematerializing the virtual machine disables at least one of the different communication pathways. That is, in one or more embodiments of the present invention, the virtual machines 214a-214c are transient entities, having only a limited lifespan. This limited lifespan may be temporally controlled or event controlled. That is, one or more of the virtual machines 214a-214c shown in FIG. 3 may be set to expire five seconds after being created (temporally-controlled), or they may be designed to expire as soon as they transmit the resource retrieval instruction 205 to the appropriate requisite resource from requisite resources 208a-208c (event controlled).

In one embodiment of the present invention, one or more processors (e.g., within the management computer 306 and/or the virtual machine support computer 316 shown in FIG. 3) install multiple virtual machines in series (e.g., virtual machines 314a-314c shown in FIG. 3) within at least one of the different communication pathways, such that the multiple virtual machines comprise a first virtual machine (e.g., virtual machine 314b) and a second virtual machine (e.g., virtual machine 314c). Assuming that the resource retrieval instruction 305 shown in FIG. 3 is initially received by virtual machine 314b in FIG. 3, then one or more processors (e.g., within management computer 306 in FIG. 3) then assigns a first address message to the first virtual machine. This first address message identifies only an address/location of the second virtual machine, and instructs the first virtual machine to send the resource retrieval instruction to the second virtual machine. One or more processors (e.g., within management computer 306 in FIG. 3) also assign a second address message to the second virtual machine. The second address message identifies only an address of the particular requisite resource (e.g., requisite resource 208a as shown in FIG. 3), and instructs the second virtual machine to send the resource retrieval instruction to the particular requisite resource.

In one embodiment of the present invention, the control of one or more of the virtual machines 314a-314c shown in FIG. 3 is further protected by a command virtual machine 307 shown in FIG. 3. As shown in FIG. 3, disparate component 212a has a command layer instruction 303, which is used by the management computer 306 to create the command virtual machine 307 used to manage virtual machine 314b. One or more processors (e.g., within management computer 306 shown in FIG. 3) fractionate the command layer instruction 303 into disparate command layer components. The processor(s) assign a first disparate command layer component to the first virtual machine (e.g., virtual machine 314b). The processor(s) then execute the first disparate command layer component to create the command virtual machine 307, which controls the first virtual machine 314b. Thus, additional protection is afforded the management computer 306 and how it controls the virtual machines 314a-314c shown in FIG. 3. This same process (i.e., generating a command virtual machine 307) can also be used to control singular virtual machines such as the virtual machines 214a-214c shown in FIG. 2.

In one embodiment of the present invention, one or more processors restrict each of the different communication pathways such that each of the different communication pathways utilizes a different type of communication pathway as compared with other communication pathways in the different communication pathways. For example and as shown in FIG. 2, the pathway leading from disparate component 212a to virtual machine 214a to requisite resource 208a may use an Internet Protocol (IP) pathway; while the pathway leading from disparate component 212b to requisite resource 208b may require the use of a different (non-IP) pathway such as a directly addressed message to a direct-access storage device (DASD), thus forgoing the use of the depicted intermediary virtual machine 214b shown in FIG. 2; while the pathway leading from disparate component 212c to virtual machine 214c to requisite resource 208a may require the use of a token ring protocol (which uses neither IP nor DASD protocols).

In one embodiment of the present invention, one or more processors (e.g., within user's computer 202 shown in FIG. 2) issue (i.e., transmit) dummy instructions on the different communication pathways. These dummy instructions utilize a same protocol as the resource retrieval instruction 205, but they do not access the particular requisite resource 208a. That is, user's computer 202 not only issues/transmits the legitimate resourced retrieval instruction 205 shown in FIG. 2, but also issues/transmits dummy instructions (not depicted) to virtual machine support computer 216 and/or resource server 204, which are addressed to non-existent resources (i.e., are sent to addresses that do not exist or else are assigned to resource slots (e.g., databases) that are empty). In this embodiment, if a sniffer tracks all of the dummy resource retrieval instructions, the sniffer will be following many false leads.

In one embodiment of the present invention, one or more processors (e.g., within the virtual machine support computer 216 and/or the management computer 206 shown in FIG. 2) instantiate dummy communication pathways, which do not access the particular requisite resource. That is, the resource retrieval instruction 205 may be sent to the virtual machine support computer 216, which then creates multiple virtual machines (e.g., virtual machines 214a-214c). However, unlike the architecture depicted in FIG. 2, virtual machine 214b and virtual machine 214c lead to a dummy requisite resource, a honey pot (e.g., a database with fake data), or an infinite loop. Thus, if a hacker/sniffer follows the pathway used by virtual machine 214b or virtual machine 214c (assuming that he/it is somehow able to break the security described above), then he/it will waste their time (if the dummy pathway leads to useless data) or else will be stuck in a loop or other piece of software/hardware that "captures" the hacker.

Defining and Responding to Threat Levels

In one embodiment of the present invention, one or more processors (e.g., within user's computer 202 and/or management computer 206 shown in FIG. 2) define a threat level for a particular requisite resource (e.g., requisite resource 208a shown in FIG. 2) and/or for a particular disparate component (e.g., disparate component 212a shown in FIG. 2), and respond accordingly. The threat level may be determined based on a multi-dimensional threat matrix, in which one or more factors determine the threat level.

For example, if a particular resource (e.g., requisite resource 208a) or a component of the application (e.g., disparate component 212a) is being subjected to CRUD (Create, Read, Update, Delete) activity that is beyond a predefined level, then this indicates that the resource/component is susceptible to attack, since there is so much CRUD activity going on.

Similarly, if a particular resource (e.g., requisite resource 208a) or a component of the application (e.g., disparate component 212a) is known to contain information that is sensitive (e.g., details of secret research and development that would harm an enterprise's operations if made public), then that particular resource or application is given a higher threat level.

Similarly, if a particular resource (e.g., requisite resource 208a) or a component of the application (e.g., disparate component 212a) is being used within an insecure location (e.g., outside of a radio frequency (RF) shielded laboratory), then that particular resource or application is given a higher threat level than if it existed within a secure location.

Similarly, if a particular resource (e.g., requisite resource 208a) or a component of the application (e.g., disparate component 212a) is being used by a person whose profile indicates that he/she primarily works on secret projects, then any resource or application used by the person is given a higher threat level than if it were used by someone who does not have such a profile (e.g., one who works only on non-sensitive/secret projects).

Based on the threat level derived (which may fluctuate up and down over time and in response to various events), various steps can be taken.

In one embodiment of the present invention, features of the virtual machine (e.g., virtual machine 214*a*) are adjusted according to the threat level for the particular requisite resource. For example, if the threat level is above a certain predefined threshold, then creation of virtual machine 214*a* can be handed off to management computer 206, thus providing an additional layer of protection for both the virtual machine 214*a* as well as the requisite resource 208*a* that is accessible by the virtual machine 214.

In one embodiment of the present invention and based on the threat level for the particular requisite resource and/or a particular disparate component, a quantity of virtual machines between the computer application and the particular requisite resource is adjusted. That is, rather than only having the three virtual machines 314*a*-314*c* in series as shown in FIG. 3, four or ten or a hundred virtual machines may be created within the virtual machine support computer 316 (and/or other virtual machine support computers—not depicted), thus providing additional protection.

In one or more embodiments, the present invention is implemented in a cloud environment. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
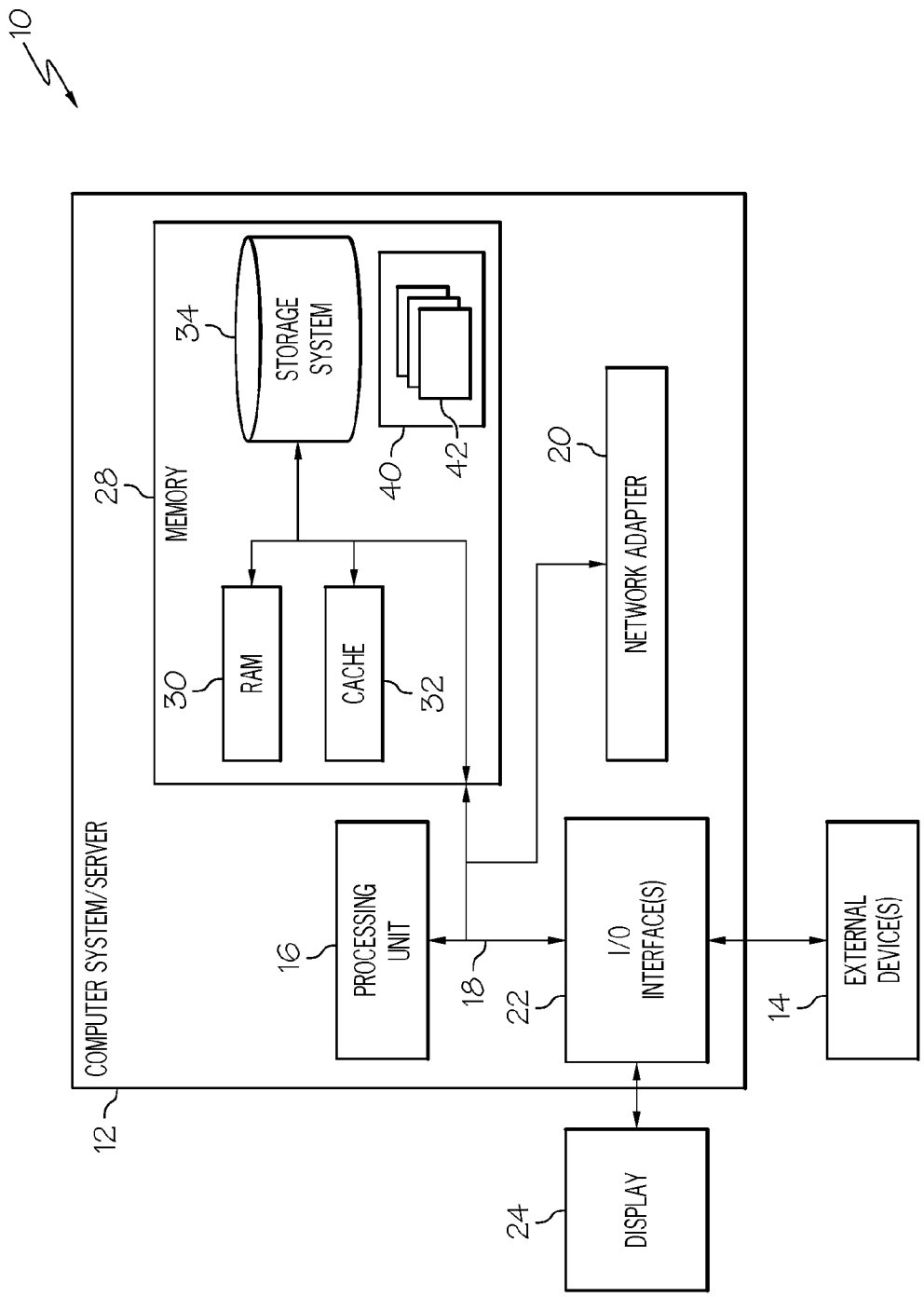
FIG. 5 depicts a cloud computing node according to an embodiment of the present disclosure.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
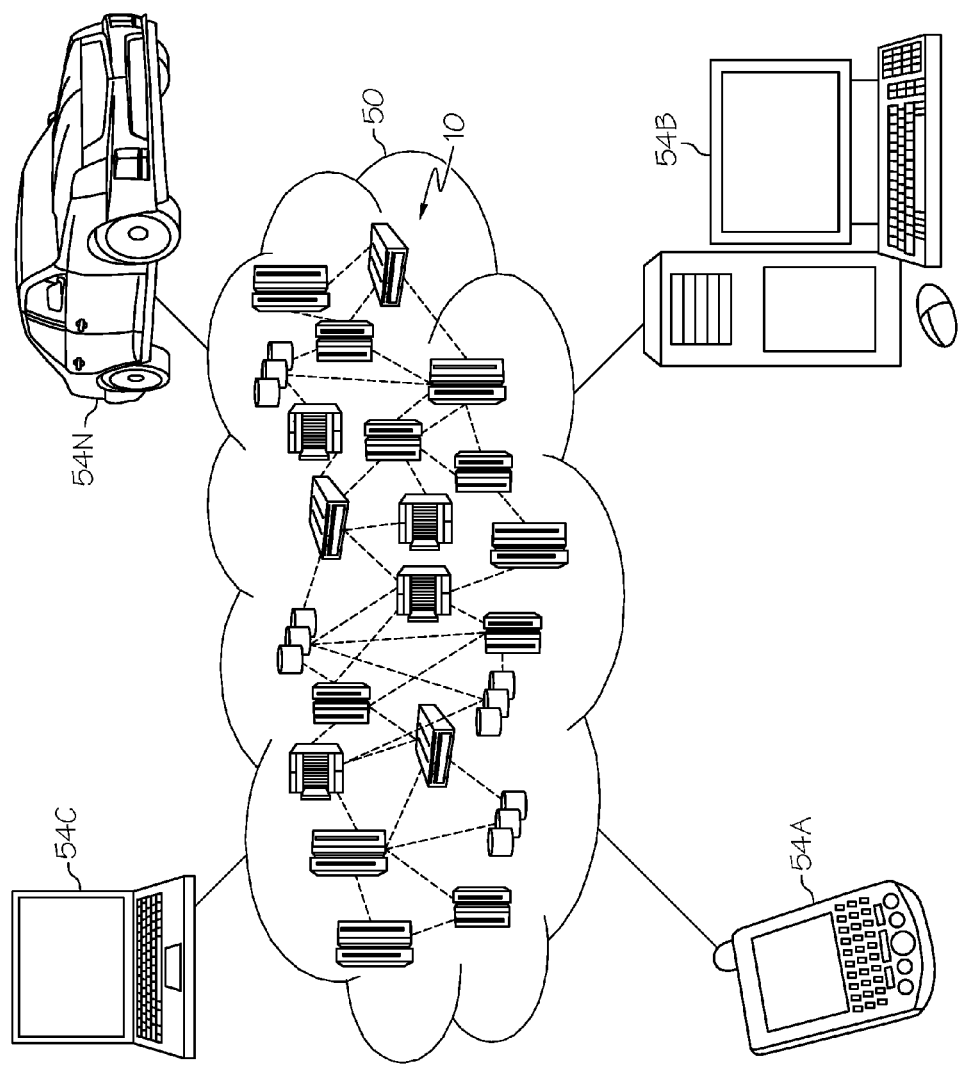
FIG. 6 depicts a cloud computing environment according to an embodiment of the present disclosure.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
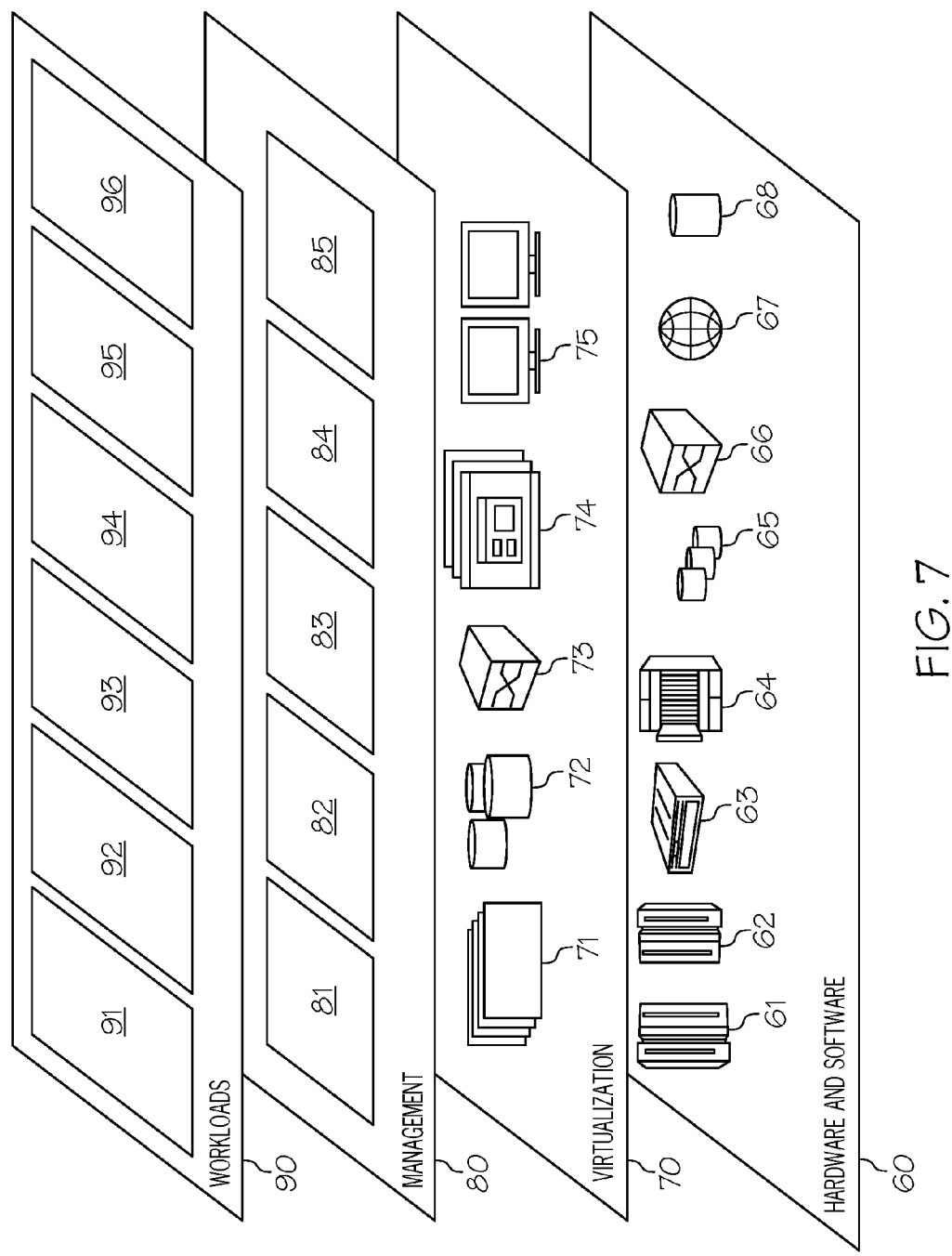
FIG. 7 depicts abstraction model layers according to an embodiment of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components.

Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and computer resource protection processing 96 (for protecting computer resources as described herein).

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method of controlling access to computer resources used by a computer application, the computer-implemented method comprising:

fractionating, by one or more processors, a computer application into disparate components;

assigning, by one or more processors, two or more of the disparate components to different communication pathways, wherein the different communication pathways lead to requisite resources needed to execute the disparate components;

creating, by one or more processors, a virtual machine, wherein the virtual machine controls access to a particular requisite resource by a particular disparate component, and wherein the particular disparate component comprises a command layer instruction;

installing, by one or more processors, the virtual machine within at least one of the different communication pathways to control access to the particular requisite resource by the particular disparate component;

transmitting, by one or more processors, a resource retrieval instruction to retrieve the particular requisite resource via the virtual machine and the at least one of the different communication pathways;

installing, by one or more processors, multiple virtual machines in series within at least one of the different communication pathways, wherein the multiple virtual machines comprise a first virtual machine and a second virtual machine;

assigning, by one or more processors, a first address message to the first virtual machine, wherein the first address message identifies only an address of the second virtual machine, and wherein the first address message instructs the first virtual machine to send the resource retrieval instruction to the second virtual machine;

assigning, by one or more processors, a second address message to the second virtual machine, wherein the second address message identifies only an address of the particular requisite resource, and wherein the second address message instructs the second virtual machine to send the resource retrieval instruction to the particular requisite resource;

fractionating, by one or more processors, the command layer instruction into disparate command layer components;

assigning, by one or more processors, a first disparate command layer component from the disparate command layer components to the first virtual machine;

executing, by one or more processors, the first disparate command layer component to create a command virtual machine; and controlling, by one or more processors, the first virtual machine via the command virtual machine.

2. The computer-implemented method of claim 1, further comprising:
retrieving, by one or more processors, the particular requisite resource; and
using, by one or more processors, the particular requisite resource to execute the particular disparate component.

3. The computer-implemented method of claim 1, further comprising:
setting, by one or more processors, an expiration time for the virtual machine within the at least one of the different communication pathways; and
in response to the expiration time passing for the virtual machine within the at least one of the different communication pathways, dematerializing, by one or more processors, the virtual machine, wherein dematerializing the virtual machine disables the at least one of the different communication pathways.

4. The computer-implemented method of claim 1, further comprising:
restricting, by one or more processors, each of the different communication pathways such that each of the different communication pathways utilizes a different type of communication pathway as compared with other communication pathways in the different communication pathways.

5. The computer-implemented method of claim 1, further comprising:
instantiating, by one or more processors, dummy communication pathways, wherein the dummy communication pathways do not access the particular requisite resource.

6. The computer-implemented method of claim 1, further comprising:
defining, by one or more processors, a threat level for the particular requisite resource; and
adjusting, by one or more processors, features of the virtual machine according to the threat level for the particular requisite resource.

7. The computer-implemented method of claim 1, further comprising:
defining, by one or more processors, a threat level for the particular requisite resource; and
adjusting, by one or more processors, a quantity of virtual machines between the computer application and the particular requisite resource according to the threat level for the particular requisite resource.

8. The computer-implemented method of claim 1, further comprising:
defining, by one or more processors, a threat level for the particular disparate component; and
adjusting, by one or more processors, features of the virtual machine according to the threat level for the particular disparate component.

9. The computer-implemented method of claim 1, wherein the disparate components provide features that have been predefined as being functionally different from one another.

10. A computer program product for controlling access to computer resources used by a computer application, the computer program product comprising a non-transitory computer readable storage medium having program code embodied therewith, the program code readable and executable by a processor to perform a method comprising:
fractionating a computer application into disparate components;
assigning two or more of the disparate components to different communication pathways, wherein the different communication pathways lead to requisite resources needed to execute the disparate components;
creating a virtual machine, wherein the virtual machine controls access to a particular requisite resource by a particular disparate component;
installing the virtual machine within at least one of the different communication pathways to control access to the particular requisite resource by the particular disparate component;
transmitting a resource retrieval instruction to retrieve the particular requisite resource via the virtual machine and the at least one of the different communication pathways;
defining a threat level for the particular requisite resource; and
adjusting a quantity of virtual machines between the computer application and the particular requisite resource according to the threat level for the particular requisite resource.

11. The computer program product of claim 10, wherein the method further comprises:
retrieving the particular requisite resource; and
using the particular requisite resource to execute the particular disparate component.

12. The computer program product of claim 10, wherein the method further comprises:
setting an expiration time for the virtual machine within the at least one of the different communication pathways; and
in response to the expiration time passing for the virtual machine within the at least one of the different communication pathways, dematerializing the virtual machine, wherein dematerializing the virtual machine disables the at least one of the different communication pathways.

13. The computer program product of claim 10, wherein the particular disparate component further comprises a command layer instruction, and wherein the method further comprises: installing multiple virtual machines in series within at least one of the different communication pathways, wherein the multiple virtual machines comprise a first virtual machine and a second virtual machine;
assigning a first address message to the first virtual machine, wherein the first address message identifies only an address of the second virtual machine, and wherein the first address message instructs the first virtual machine to send the resource retrieval instruction to the second virtual machine;
assigning a second address message to the second virtual machine, wherein the second address message identifies only an address of the particular requisite resource, and wherein the second address message instructs the second virtual machine to send the resource retrieval instruction to the particular requisite resource;
fractionating the command layer instruction into disparate command layer components;
assigning a first disparate command layer component from the disparate command layer components to the first virtual machine;
executing the first disparate command layer component to create a command virtual machine; and
controlling the first virtual machine via the command virtual machine.

14. A computer system comprising:
  a processor, a computer readable memory, and a non-transitory computer readable storage medium;
  first program instructions to fractionate a computer application into disparate components;
  second program instructions to assign two or more of the disparate components to different communication pathways, wherein the different communication pathways lead to requisite resources needed to execute the disparate components;
  third program instructions to create a virtual machine, wherein the virtual machine controls access to a particular requisite resource by a particular disparate component;
  fourth program instructions to install the virtual machine within at least one of the different communication pathways to control access to the particular requisite resource by the particular disparate component;
  fifth program instructions to transmit a resource retrieval instruction to retrieve the particular requisite resource via the virtual machine and the at least one of the different communication pathways;
  sixth program instructions to define a threat level for the particular requisite resource; and
  seventh program instructions to adjust a quantity of virtual machines between the computer application and the particular requisite resource according to the threat level for the particular requisite resource; and wherein
the first, second, third, fourth, fifth, sixth, and seventh program instructions are stored on the non-transitory computer readable storage medium for execution by one or more processors via the computer readable memory.

15. The computer system of claim 14, further comprising:
  eighth program instructions to retrieve the particular requisite resource; and
  ninth program instructions to use the particular requisite resource to execute the particular disparate component; and wherein
the eighth and ninth program instructions are stored on the non-transitory computer readable storage medium for execution by one or more processors via the computer readable memory.

16. The computer system of claim 14, wherein the particular disparate component further comprises a command layer instruction, and wherein the computer system further comprises:
  eighth program instructions to install multiple virtual machines in series within at least one of the different communication pathways, wherein the multiple virtual machines comprise a first virtual machine and a second virtual machine;
  ninth program instructions to assign a first address message to the first virtual machine, wherein the first address message identifies only an address of the second virtual machine, and wherein the first address message instructs the first virtual machine to send the resource retrieval instruction to the second virtual machine;
  tenth program instructions to assign a second address message to the second virtual machine, wherein the second address message identifies only an address of the particular requisite resource, and wherein the second address message instructs the second virtual machine to send the resource retrieval instruction to the particular requisite resource;
  eleventh program instructions to fractionate the command layer instruction into disparate command layer components;
  twelfth program instructions to assign a first disparate command layer component from the disparate command layer components to the first virtual machine;
  thirteenth program instructions to execute the first disparate command layer component to create a command virtual machine; and
  fourteenth program instructions to control the first virtual machine via the command virtual machine; and wherein
the eighth, ninth, tenth, eleventh, and twelfth program instructions are stored on the non-transitory computer readable storage medium for execution by one or more processors via the computer readable memory.

* * * * *